(12) United States Patent
Khalil et al.

(10) Patent No.: US 9,474,011 B2
(45) Date of Patent: Oct. 18, 2016

(54) METHOD AND APPARATUS FOR PROVIDING ACCESS CONTROLS FOR A RESOURCE

(71) Applicant: Verizon Patent and Licensing Inc., Arlington, VA (US)

(72) Inventors: Manah M. Khalil, Coppell, TX (US); Siddharth Pandey, Irving, TX (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 179 days.

(21) Appl. No.: 14/341,032

(22) Filed: Jul. 25, 2014

(65) Prior Publication Data
US 2016/0029291 A1    Jan. 28, 2016

(51) Int. Cl.
H04W 24/00    (2009.01)
H04W 48/02    (2009.01)
H04W 52/02    (2009.01)

(52) U.S. Cl.
CPC ......... *H04W 48/02* (2013.01); *H04W 52/0251* (2013.01)

(58) Field of Classification Search
None
See application file for complete search history.

(56) References Cited

U.S. PATENT DOCUMENTS

| 8,111,811 | B2* | 2/2012 | Chilton | H04M 3/5232 379/26.02 |
| 8,548,452 | B2* | 10/2013 | Coskun | G06Q 10/10 455/419 |
| 2006/0190117 | A1* | 8/2006 | Weczorek | H04L 12/581 700/103 |
| 2006/0288207 | A1* | 12/2006 | Brown | H04L 63/0428 713/166 |
| 2010/0088140 | A1* | 4/2010 | Gil | G06Q 10/06311 705/7.15 |
| 2010/0131385 | A1* | 5/2010 | Harrang | G06Q 30/00 705/26.1 |
| 2012/0089699 | A1* | 4/2012 | Cholas | H04L 12/2812 709/217 |
| 2012/0130872 | A1* | 5/2012 | Baughman | G07B 15/02 705/32 |
| 2015/0134948 | A1* | 5/2015 | Boyle | H04L 63/0428 713/152 |
| 2015/0172449 | A1* | 6/2015 | Clavenna, II | H04M 1/72577 455/418 |
| 2015/0365234 | A1* | 12/2015 | Marten | H04L 9/3226 713/183 |

* cited by examiner

*Primary Examiner* — Dominic Rego

(57) ABSTRACT

An approach is provided for enabling a subscriber to establish rules for controlling user interaction with a resource based on the activity of the user. A reactive control platform monitors a current activity of a user of a device, one or more services, or a combination thereof associated with a subscriber during access by the user to a network of a subscriber. The status of the user is determined based on the monitoring, profile information associated with the user, or a combination thereof. A request for input from the subscriber for specifying one or more rules to be enforced for affecting a use of the device, the one or more services, the network of the subscriber, or a combination thereof by the user is then generated based on the determination.

20 Claims, 9 Drawing Sheets

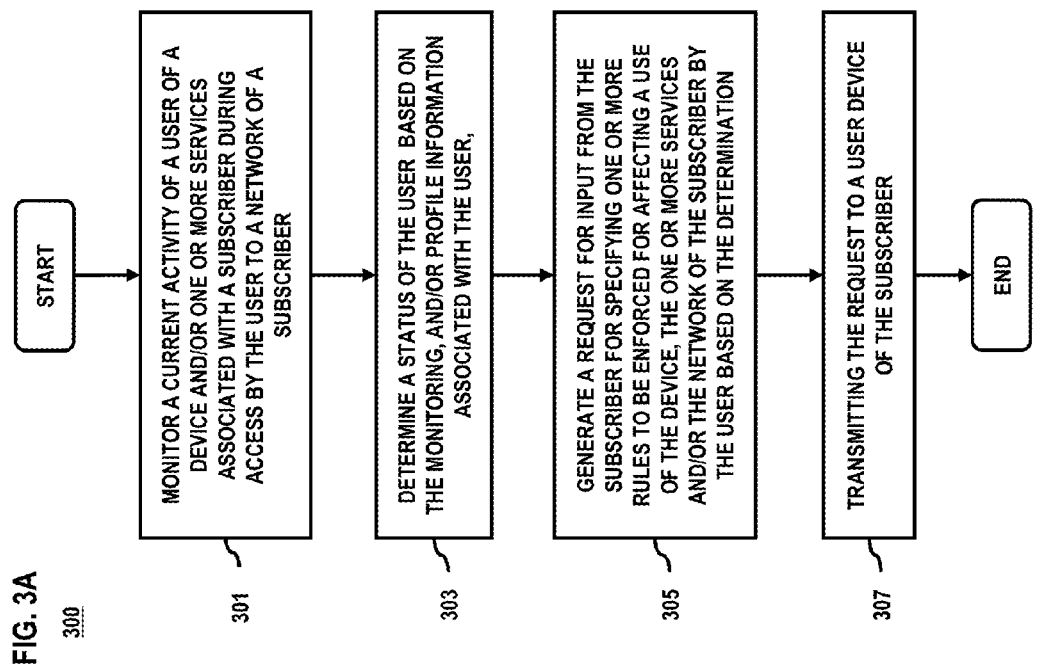

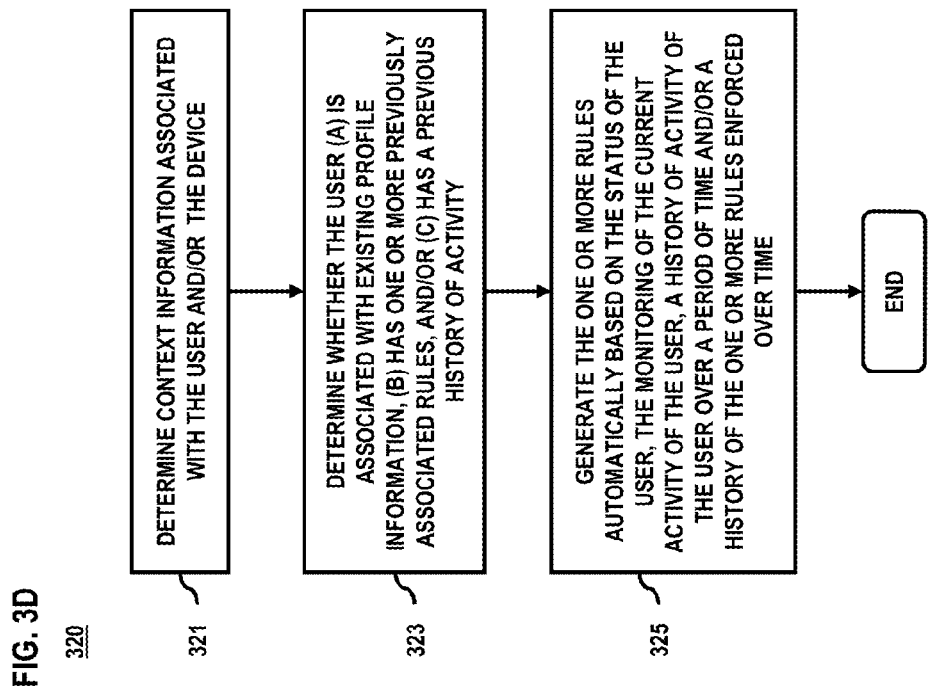

FIG. 3D
320
321 DETERMINE CONTEXT INFORMATION ASSOCIATED WITH THE USER AND/OR THE DEVICE
323 DETERMINE WHETHER THE USER (A) IS ASSOCIATED WITH EXISTING PROFILE INFORMATION, (B) HAS ONE OR MORE PREVIOUSLY ASSOCIATED RULES, AND/OR (C) HAS A PREVIOUS HISTORY OF ACTIVITY
325 GENERATE THE ONE OR MORE RULES AUTOMATICALLY BASED ON THE STATUS OF THE USER, THE MONITORING OF THE CURRENT ACTIVITY OF THE USER, A HISTORY OF ACTIVITY OF THE USER OVER A PERIOD OF TIME AND/OR A HISTORY OF THE ONE OR MORE RULES ENFORCED OVER TIME
END

FIG. 3C
314
315 INITIATE ENFORCEMENT OF THE ONE OR MORE RULES BASED ON THE INPUT AND/OR THE PROFILE INFORMATION ASSOCIATED WITH THE USER
317 GENERATE AN ENFORCEMENT MESSAGE BASED ON THE STATUS OF THE USER
319 INITIATE A PRESENTMENT OF THE ENFORCEMENT MESSAGE TO THE DEVICE, AND/OR ANOTHER DEVICE ASSOCIATED WITH THE USER
END

METHOD AND APPARATUS FOR PROVIDING ACCESS CONTROLS FOR A RESOURCE

BACKGROUND INFORMATION

With the growing popularity of computers, interactive electronic communications and on demand media, consumers now have access to a wealth of entertainment, information retrieval and communication services. For example, many consumers take advantage of broadband based audio and video services, which they can access via their mobile devices, computers or set-top boxes (STBs). These services and devices enable users to perform activities such as record content, queue television programs, play video games, perform video conferencing, access the Internet, etc. Typically, the subscriber to the service can configure one or more settings or controls (e.g., parental controls) for controlling how other users access these services or devices. Unfortunately, these settings must be established in advance to be effective and the process for establishing the settings can be cumbersome.

Therefore, there is a need for an approach to enable a subscriber to establish rules for controlling user interaction with a resource based on the activity of the user.

BRIEF DESCRIPTION OF THE DRAWINGS

Various exemplary embodiments are illustrated by way of example, and not by way of limitation, in the figures of the accompanying drawings in which like reference numerals refer to similar elements and in which:

FIGS. 3A-3D are flowcharts of a process for enabling a subscriber to establish rules for controlling user interaction with a resource based on the activity of the user, according to various embodiments;

DESCRIPTION OF THE PREFERRED EMBODIMENT

A preferred apparatus, method, and software for enabling a subscriber to establish rules for controlling user interaction with a resource based on the activity of the user is described. In the following description, for the purposes of explanation, numerous specific details are set forth in order to provide a thorough understanding of the preferred embodiments of the invention. It is apparent, however, that the preferred embodiments may be practiced without these specific details or with an equivalent arrangement. In other instances, well-known structures and devices are shown in block diagram form in order to avoid unnecessarily obscuring the preferred embodiments of the invention.

Although various exemplary embodiments are described with respect to a content processing device such as a set-top box (STB), it is contemplated these embodiments have applicability to any device or system requiring usage permissions to be granted for facilitating a level of usage or access to said device or system. This may include, for example, a home communication terminal (HCT), a digital home communication terminal (DHCT), a stand-alone personal video recorder (PVR), a television set, a digital video disc (DVD) player, a video-enabled phone, an audio/video-enabled personal digital assistant (PDA), a personal computer (PC), as well as other like technologies and customer premises equipment (CPE). It is further noted that the exemplary embodiments herein may also have applicability to security systems, gated entry or doorway systems, intelligent vehicle system, network based applications or services, or the like.

Figure 1:
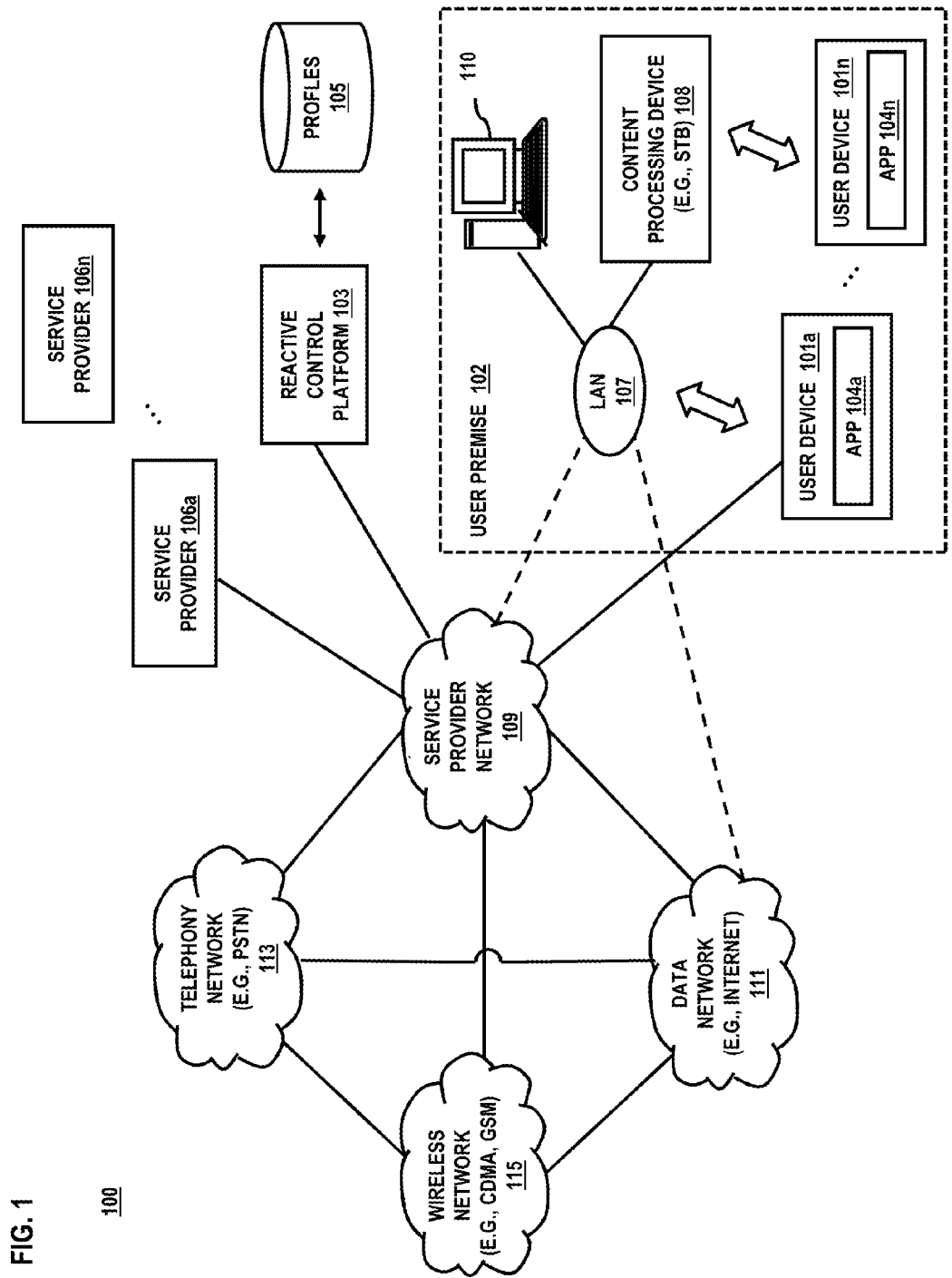
FIG. 1 is a diagram of a system for enabling a subscriber to establish rules for controlling user interaction with a resource based on the activity of the user, according to an exemplary embodiment.

FIG. 1 is a diagram of a system for enabling a subscriber to establish rules for controlling user interaction with a resource based on the activity of the user, according to one embodiment. For the purposes of illustration, the system 100 includes a reactive control platform 103, which operates in connection with one or more resources, including user devices 101a-101n (referred to herein collectively as user devices 101), one or more content processing devices (e.g., a set-top box) 108, one or more computers 110, or other devices capable of interacting with a local area network (LAN) 107 configured for operating at a user premise 102 (e.g., their home or business). It is noted that the resources may be directly connected to the LAN 107 or wirelessly connected for enabling the exchange of data with each other and various service providers 106a-106n (referred to herein collectively as service providers 106) via a broader network (e.g., service provider network 109 or data network 111).

As mentioned previously, the above described resources (e.g., content processing device 108) may execute services for streaming media and audio content, accessing files, facilitating social networking, etc. The devices may access these services by way of applications 104, which may be configured to perform one or more network tasks. In some instances, the network connectivity for accessing these services, as offered by providers 106, is provided by a local area network (LAN 107) configured for a premise 102. By way of the LAN 107, multiple different users may operate the devices 108 and/or 110 in order to access the services 106. In addition to interacting directly with the devices via the LAN 107, the users may also connect their tablets, smartphones or other mobile devices to the LAN 107 of the premise 102 or alternatively with the other devices (e.g., the set-top box). Access to the LAN 107 may be granted to the users based on a simple password authentication procedure.

Typically, a subscriber responsible for providing the LAN 107 may configure usage controls for affecting the ability of other users within the premise 102 to access and/or use the LAN 107, the different services 106 capable of being accessed by respective devices 108, 110 and 101, or a combination thereof. For example, parental controls may be established for preventing younger users from accessing broadband movies via a set-top box 108 that are known to contain violence, sexually explicit scenes, profanity, etc. As another example, a restaurant owner may limit access to a LAN 107 of the business to 30 minutes for regular patrons during lunch hours while having no such restrictions for premium customers. Various other controls may be established in advance by the subscriber as a way of preempting, anticipating, limiting or denying usage of the LAN 107 or the different services 106 or devices 108, 110 and 101.

Unfortunately, setting up the controls for these resources can be a cumbersome process for the subscriber. In addition, given the vast array of services available to the different users having access to the LAN 107 (e.g., the members of a household), customizing the controls can require much time and effort. For this reason, many subscribers avoid establishing the controls altogether. There is currently no convenient means for enabling a subscriber to establish such controls in response to real-time actions performed by one or more users. In addition, there is currently no mechanism for enabling the automatic generation of rules (controls) based on the actions performed by users over time.

To address this issue, system 100 of FIG. 1 presents a reactive control platform 103 configured to initiate the generation of controls, or rules, regarding one or more users of one or more resources of a subscriber. In one embodiment, the reactive control platform 103 generates rules for impacting the extent of use or access of a resource in response to real-time actions performed by users as they interact with them. For the purpose of illustration herein, the rules may be executed as one or more customizable controls at the device and/or service and may include one or more conditions, criteria, instructions or the like.

Also, as noted previously, the resources that are to be subject to the one or more rules may include any devices (e.g., content processing device 108) or services (e.g., those of service providers 106) of the premise 102 capable of operating over the LAN 107 of the subscriber. As such, the rules may apply to the resources as they are employed within the premise 102. The rules may also be enforced in the case where the wireless/network range of the LAN 107 extends beyond the premise 102. For the purpose of illustration herein, the rules may be applied and/or enforced with respect to any of the client devices that access the network, the network components (e.g., routers, hubs) that enable the LAN 107, or a combination thereof. Hence, the reactive control platform 103 detects an action executed by a user with respect to any connected resource.

In one embodiment, the reactive control platform 103 monitors the activities of users as they interact with the resources of the premise 102. By way of example, in the case where a user at the premise 102 activates the set-top box 108, selects movie content, changes the channel, initiates a recording, etc.; all of these activities are detected by the reactive control platform 103. As another example, when a user of a mobile device that is connected to an in-home wireless network of the subscriber attempts to access a streaming media service, download news content, access a video conference service, or the like, these activities are also detected. Hence, the execution of the platform 103 is triggered by real-time performance of an activity of a user. The reactive control platform 103 persistently monitors the real-time activities of any user, device or service 101 that accesses the LAN 107 via router device (not shown).

In one embodiment, the reactive control platform 103 determines a status of the user that performs the real-time action as monitored. The status may indicate whether the user is a first time or previous user of the service (e.g., per service providers 106), the device (e.g., STB 108, user device 101) or the network. By way of example, the status of the user may be identified by determining whether the user responsible for performing the triggering action is associated with existing profile information maintained by database 105. The profile information 108 may be generated during an initial registration or accessing of the device or service by a user and may include, for example, user name information, identifier information, device identifier information, biometric information, or the like.

As another example, the platform 103 may also determine whether any rules have been previously established for the user or if a previous history of activity is associated with the user. In the case where existing profile information, rules or activity information exists for the user, the reactive control platform 103 determines the user is a previous user of the device or service from which the activity was initiated. Per this execution, the identity of the user may be determined accordingly and associated with a specific identifier, name information, avatar, etc. In the case where no existing profile information, rules or activity information exists for the user, the platform 103 determines the user is a new user of the device or service from which the activity was initiated. Per this execution, the identity of the user may be deemed unknown to the subscriber.

In one embodiment, the reactive control platform 103 may also process context information associated with the user, the device (e.g., STB 108 or computer 110), or a combination thereof as a means of further determining the status of the user. It is noted that by identifying the status of the user, the reactive control platform 103 may support the real-time generating of profile information and associated rules for new users. In addition, the platform 103 may support the updating and/or adapting of profile information and associated rules for existing users. In either case, the generating or updating of the profile information is performed in response to an action of a user of a device 101, 108, 110 or service 106 operated via the LAN 107 of the subscriber. This is in contrast to traditional approaches for generating profile information and associated rules, wherein each user profile must be configured in advance. It is contemplated, in certain embodiments, that login or authentication information for enabling access of the user or a device of the user to the LAN 107 may also be processed for determining a status of the user.

In one embodiment, the reactive control platform 103 generates a request for input from the subscriber for specifying rules to be associated with the user based on their determined status. Per this approach, the input may specify a response of the subscriber to a current action (e.g., real-time) of a user as they interact with a resources of the premise 102. By way of example, the request is sent as an input message to a device of the subscriber, i.e., a mobile device, wherein the message requires direct feedback from the subscriber. In certain implementations, the continued action of the user with respect to the resource (e.g., STB 108) may be halted or postponed pending a response from the subscriber. Alternatively, the activity being engaged by the user with respect to a resource may continue normally. In the latter scenario, the normal operation or activity of the resource may change depending on the rules specified by the user.

The request sent to the subscriber may indicate the status of the user in question. This may include, for example, the identity of the user along with details for indicating they are a first time or previous user of a given device or service associated with the subscriber. In addition, the request may indicate the specific device or service the user is interacting with at the moment along with the current activity of the user. For example, the request may indicate a user is attempting to join in a collaborative video gaming session using the video game console in the living room entitled "Family Game System." Still further, the request may specify one or more additional details (metadata) regarding the resource being used, including category information, type information, or the like pertaining to the device or service. For example, in the case where a user attempts to access a pay-per-view movie, the request message may indicate the name of the movie, the associated genre/category, the associated parental advisory rating (e.g., G, PG-13, R, NC-17), the movie description, the content provider (e.g., the name of the broadcast or service provider 106), or other details. It is noted that presentment of this information per the request enables the subscriber to more readily evaluate the user activity and decide upon one or more rules to submit as input for responding to said activity.

In one embodiment, the request may further indicate one or more subscriber selection or input options for specifying rules to be associated with a user in response to their interaction with a resource. As noted previously, the input may indicate various conditions, criteria, instructions or the like, which when established, impact the current or subsequent interaction of the user with the resource. By way of example, the request message may indicate an option (to be received as input) for allowing the action of the user, denying the action of the user or restricting the action of the user. Allowance of the action corresponds to subscriber acceptance of the activity of the user—i.e., continued usage of the LAN 107 to view of a movie. In contrast, denial of the action corresponds to lack of acceptance of the subscriber of the activity being engaged by the user. In the case where the subscriber opts to restrict the action, this corresponds to acceptance of the action based on one or more conditions. The reactive control platform 103 enables the presentment of a configuration interface for enabling the subscriber to establish the restrictions.

By way of example, the restricting may include limiting the amount of time the user may access the resource or limiting the use to specify type of content or activities. Per this execution, when the resource is a computer, the time restriction may limit the user to 90 minutes of use or to a particular period of use (e.g., 3 pm-5 pm). In addition, an activity or content type restriction may be specified for indicating the user is limited to only accessing documents and audio content related to science and mathematics but not movies or streaming media. As another example, the restriction may specify a network location, content provider, channel, or the like that the user it to be limited to for further inhibiting their interaction with the resource in question.

It is noted that multiple restrictions may be associated with the user in regards to their determined activity. As such, each restriction specified as input by the subscriber serves as a further means of filtering the level of activity of the user with the specified resource. Also of note, because the request/response procedure is facilitated by way of a mobile device of the subscriber, the subscriber may specify rules from any location as long as they have access to a network (e.g., service provider network 109). Under this approach, the user is not required to interact directly with the devices 108, 110 or 101 or the services associated with said devices per service providers 106 in order to establish rules (controls). Furthermore, the user is not required to be physically located within the premise 102 in order to establish rules (controls).

In one embodiment, the reactive control platform 103 stores the input provided by the user as one or more rules in association with profile information 105 for the user. Once stored, the reactive control platform 103 is then able to initiate enforcement of the rules accordingly for impacting the current or subsequent use of the resource at the premise 102. In the case, for example, where the status of the user is determined to be new (e.g., a first time user of the resource in question), a new profile may be generated in association with the user, a device of the user, or a combination thereof based on the contextual information, the monitored activity of the user and any other data regarding the new user. As such, the subscriber specified input (rules) may be stored in association with distinct profile information for the user. In the case, for example, where the status of the user indicates they are a previous user, the existing profile information may be updated to include the specified rules. By way of this approach, a prior set of rules related to the same activity, device or service may be overwritten or appended in order to reflect the most recent rule set. As will be discussed further later on herein, the rules may be subsequently adapted by the reactive control platform 103 automatically—i.e., without requesting further input from the subscriber.

It is further noted that activity information may also be stored in association with the profile information for enabling subsequent recall of the actions performed by users with respect to the resource. As such, the activity information may be aggregated over time to compile an activity history for the user, which may be subsequently analyzed by the platform 103 for determining the status of the user. The activity information may include any data for indicating the specific action performed by the user, such as a channel change, a content download request, a display settings change, a device or service activation request (e.g., ON/OFF), a login request, a broadcast request, an authentication request, accessing of an address or online resource, etc.

In one embodiment, the reactive control platform 103 initiates enforcement of the rules as stored in association with the profile information. The enforcement may correspond to execution of the one or more conditions, criteria, instructions or the like by the devices 108, 110 or 101, the one or more services (per service providers 106), or a combination thereof. Still further, the enforcement may correspond to the action of accepting, denying or restricting the activity of a user with respect to a given resource of the premise 102. By way of example, the reactive control platform 103 may submit a command to the devices and/or one or more services to invoke (initiate) execution of the rules. The command may be submitted to the specified device or service according to a machine language, processing language, control schema, or the like corresponding to the operating system or device processing system of the resource in question. In certain instances, the rules may themselves be generated according to a specific machine language, control schema or the like.

In one embodiment, the reactive control platform 103 generates a message regarding the enforcement. The context and/or content of the message may vary depending on the status of the user or whether the message is intended for the subscriber. By way of example, the message may indicate the enforcement action specified by the subscriber in response to the current activity of the user, i.e., restricted access to the movie content requested by the user. In addition, the message may provide details regarding a specific restriction, including established time limits or access limits. It is contemplated, in certain embodiments, that the enforcement message may also indicate one or more alternative actions available to a user in response to a restriction. For example, in the case where the user of a set-top box is restricted from accessing R rated movies, the platform 103 may indicate that movies rated PG-13 and below are acceptable along with a movie recommendation.

In one embodiment, the reactive control platform 103 generates one or more rules automatically based on the determined status of the user and the monitored activities engaged by the user with the resources of the premise 102 over a period of time. Per this approach, the subscriber need not provide an input for specifying the one or more rules to be applied with respect to a monitored activity of a user. Rather, the platform 103 may intelligently assign and/or generate rules to associate with the profile of the user. This may correspond to an automated learning capability of the platform 103, wherein the activity history of the user is observed to identify the resource usage patterns of the user. In addition, the subscriber response history may be observed over a period of time for enabling the platform 103 to observe the rules enforced in connection with the user. The platform 103 may be configured to analyze this historic data based on one or more known learning algorithms, data generalization approaches, data mining techniques or the like. Based on this analysis, the platform 103 may generate a behavior model for representing an anticipated response of the subscriber to future actions performed by a specific user as they interact with a resource. In addition, the platform 103 may generate a model for representing an anticipated response of the subscriber to the activities of new users, i.e., those users with limited or no existing profile information.

By way of example, the reactive control platform 103 may observe a tendency of a parent to associate a rule for blocking content that is rated R and above for a child who attempts to access movies from a streaming media service via a tablet device. Per this scenario, the platform 103 may initially request an input from the parent for specifying the restriction in response to an attempt by the child to access this content. However, in response to a subsequent attempt by the child to access the same type of content from their mobile phone, the same blocking rule may be applied by the platform 103. As another example, the platform 103 may apply this rule in response to an attempt by the child to activate a video game featuring adult content and violence. Still further, the platform 103 may restrict access to the streaming media service until 7 pm based on a tendency of non-use of the service by the child until this time, a similar rule established for a sibling, online calendar information for indicating standard homework times of the family, or a combination thereof. It is noted, in the latter example, that one or more external data sources may be utilized by the platform 103 for enabling the generation of rules.

In one embodiment, a feedback message may also be generated for the subscriber in response to automatic generation of a rule. The feedback message may be presented to the mobile device of the subscriber for indicating the reactive control platform 103 has generated one or more rules in response to a monitored activity of the user with respect to a resource (e.g., content processing device 108). As such, the one or more rules may be presented as a recommendation to the subscriber. In addition, the feedback message may present one or more user input or selection options for indicating a response of the user to generation of the rules. By way of example, the input or selection options may include an acknowledgement of the rules, a canceling of the rules, an adapting of the rules, or a combination thereof. In the case where the subscriber selects to adapt the rules, the adapted rules are stored in association with profile information (e.g., per database 105) for the user as opposed to the rules generated by the reactive control platform 103.

It is noted that the above described embodiments enable rules for controlling the use or access of one or more resources of a premise 102 to be generated based on real-time interaction by users with said resources. This presents a subscriber that maintains a personal network, such as via LAN 107, with several advantages. In one advantage, the rules may be developed based on actual use or access of a resource and continually refined thereafter. As such, the rules for affecting how users interact with various devices 108, 110 and/or 101 or services (e.g., per service providers 106) over a LAN 107 may be developed "on-the-fly" rather than having to be configured in advance. As another advantage, the rules may be customized with respect to different users, devices and services, thus reducing the time required of the subscriber to establish the necessary access controls. Any system wherein shared access to resources are required may benefit from execution of the system 100 presented herein.

In certain embodiments, user devices 101a-101n, the reactive control platform 103, the service providers 106, the local area network (LAN) 107 (e.g., per a router device) and other elements of system 100 may be configured to communicate via a service provider network 109. According to certain embodiments, one or more networks, such as data network 111, telephony network 113, and/or wireless network 115, can interact with the service provider network 109. Networks 109-115 may be any suitable wireline and/or wireless network, and be managed by one or more service providers. For example, telephony network 113 may include a circuit-switched network, such as the public switched telephone network (PSTN), an integrated services digital network (ISDN), a private branch exchange (PBX), or other like network.

Networks 109-115 may employ various technologies for enabling wireless communication including, for example, code division multiple access (CDMA), long term evolution (LTE), enhanced data rates for global evolution (EDGE), general packet radio service (GPRS), mobile ad hoc network (MANET), global system for mobile communications (GSM), Internet protocol multimedia subsystem (IMS), universal mobile telecommunications system (UMTS), etc., as well as any other suitable wireless medium, e.g., microwave access (WiMAX), wireless fidelity (WiFi), satellite, and the like. Meanwhile, data network 111 may be any local area network (LAN), metropolitan area network (MAN), wide area network (WAN), the Internet, or any other suitable packet-switched network, such as a commercially owned, proprietary packet-switched network, such as a proprietary cable or fiber-optic network.

Still further, the communication provider network may embody circuit-switched and/or packet-switched networks that include facilities to provide for transport of circuit-switched and/or packet-based communications. It is further contemplated that networks 109-115 may include components and facilities to provide for signaling and/or bearer communications between the various components or facilities of system 100. In this manner, the communication network 105 may embody or include portions of a signaling system 7 (SS7) network, Internet protocol multimedia subsystem (IMS), or other suitable infrastructure to support control and signaling functions.

It is noted, though not shown in the figure, that in certain embodiments user devices 101a-101n may be configured to establish peer-to-peer communication sessions with each other using a variety of technologies—near field communication (NFC), Bluetooth, ZigBee, infrared, etc. Also, connectivity can be provided via a wireless local area network (LAN). By way of example, a group of user devices 101a-101n may be configured to a common LAN so that each device can be uniquely identified via any suitable network addressing scheme. For example, the LAN may utilize the dynamic host configuration protocol (DHCP) to dynamically assign "private" DHCP internet protocol (IP) addresses to each user device 101, i.e., IP addresses that are accessible to devices connected to the service provider network 109 as facilitated via a router.

Figure 2:
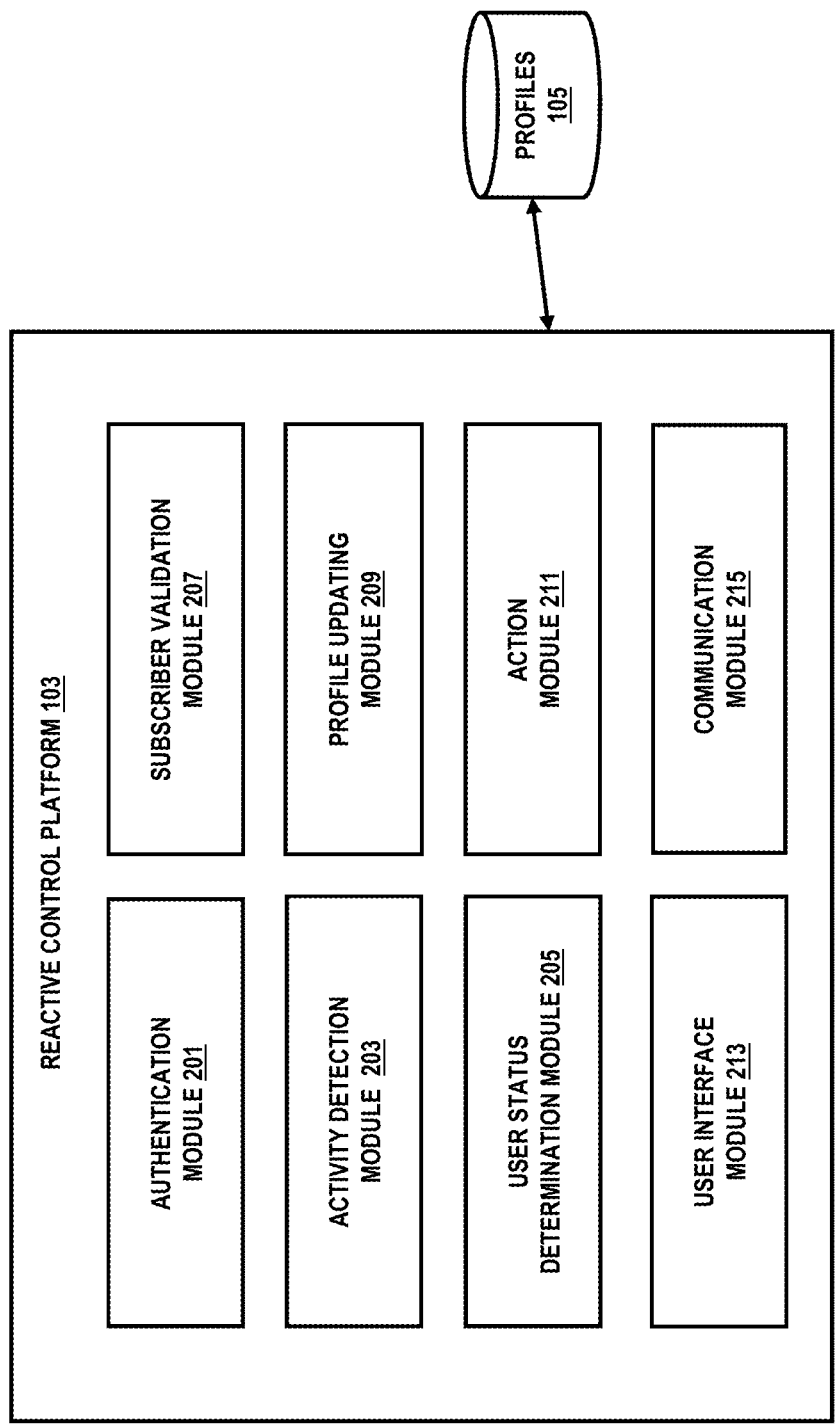
FIG. 2 is a diagram of a reactive control platform, according to one embodiment.

FIG. 2 is a diagram of a reactive control platform, according to one embodiment. The reactive control platform 103 includes various executable modules for performing one or more computing, data processing and network based instructions that in combination provide a means for enabling a subscriber to establish rules for controlling user interaction with a resource based on the activity of the user. Such modules can be implemented in hardware, firmware, software, or a combination thereof. By way of example, the reactive control platform 103 may include an authentication module 201, an activity module 203, a user status determination module 205, a subscriber validation module 207, a profile updating module 209, an action module 211, a user interface module 213 and a communication module 215. In addition, the reactive control platform 103 also accesses profile information from a database 105.

In one embodiment, an authentication module 201 authenticates users and user devices 101a-101n for interaction with the reactive control platform 103. By way of example, the authentication module 201 receives a request to subscribe to the platform 103 as a subscriber having administrative authority and control. As such, the subscriber is able to regulate the activities of other users. The subscription process may include specifying the one or more devices and/or services to be regulated and/or connected to a local area network (LAN) 107. In addition, the subscriber may specify the one or more users having permission to access the various devices and/or services via the LAN 107. This may include, for example, indicating a username, user identifier, or device identifier. In this case, an initial set of profile information may be stored to database 105 accordingly. Under this scenario, the profile information is stored devoid of any associated rules.

The authentication process performed by the module 201 may also include receiving and validating a login name and/or user identification value as provided or established for a particular user during a subscription or registration process with the service provider. In addition, the module 201 may operate in connection with a router associated with the LAN 107 for acquiring a user identification value. The login name and/or user identification value may be received as input provided by the user from the user device 101 or other device via a graphical user interface to the platform 103 (e.g., as enabled by user interface module 215). Profile information for respective subscribers or users, which contains pertinent user or device data, may be cross referenced as part of the login process. Alternatively, the login process may be performed through automated association of profile settings with an IP address, a carrier detection signal of a user device, mobile directory number (MDN), subscriber identity module (SIM) (e.g., of a SIM card), radio frequency identifier (RFID) tag or other identifier.

In one embodiment, the activity detection module 203 is configured to determine the current activity of the user. By way of example, the activity detection module 203 monitors the activities of users as they interact with the resources of the premise 102. This includes operating in connection with the authentication module 201 to determine an identity of the user. In addition, the module 203 determines the type of activity performed as well as the device or service associated with the activity. For example, the activity detection module 203 determines when a user at the premise 102 activates a set-top box 108, selects movie content, changes a channel, initiates a recording, etc.

In one embodiment, the user status determination module 205 determines the status of a user based on their interaction with a resource of the user premise 102. By way of example, the user status determination module 205 submits an instruction for the authentication module 201 to retrieve profile information regarding the user that initiated an activity with a resource. In the case where the query is successful, the module 205 determines the user is a previous user and further determines any current rules associated with the user. In contrast, when the query fails, the module 205 determines the user as new and operates with the authentication module 201 to establish initial profile information.

It is noted that the user status determination module 205 may also process context information as gathered per various sensors (not shown) of the devices of the user premise, the one or more user devices 101, or a combination thereof. By way of example, the module 205 may process user or device identifier information, temporal information relating to the time of occurrence of an activity or any other information useful for identifying the user.

In one embodiment, the subscriber validation module 207 operates in connection with the user interface module 213 to generate a request for input from the subscriber for specifying rules to be associated with the user based on their determined status. Per this approach, the input may specify a response of the subscriber to a current action (e.g., real-time) of a user as they interact with a resources of the premise 102. By way of example, the request is sent as an input message to a device of the subscriber, i.e., a mobile device, wherein the message requires direct feedback from the subscriber. The input may include an option to accept, deny or restrict the activity of the determined user of a given resource.

In the case where the subscriber opts to restrict the action, the subscriber validation module 207 enables presentment of a configuration interface for enabling the subscriber to establish the restrictions. The configuration interface may be generated in connection with the user interface module 213. As such, the subscriber may be presented with options for establishing date or time range restrictions, content type restrictions, channel restrictions, or the like. It is noted that the input provided in response to the request corresponds to the one or more rules to be applied for enforcement with respect to a user.

In one embodiment, the profile updating module 209 generates or updates profile information in association with a user that initiated an activity with respect to a resource. This corresponds to a storing of the input (rules) acquired via the subscriber validation module 207. By way of example, the storing is performed based on the determined status of the user per the user status determination module 205, the response to the request initiated by the subscriber validation module 207, or a combination thereof. In the case, for example, where the status of the user is determined to be new (e.g., a first time user of the resource in question), a new profile may be generated in association with the user, a device of the user, or a combination thereof based on the contextual information, the monitored activity of the user and any other data regarding the new user. As such, the subscriber specified input (rules) may be stored in association with distinct profile information for the user.

In the case, for example, where the status of the user indicates they are a previous user, the existing profile information may be updated to include the specified rules. By way of this approach, a prior set of rules related to the same activity, device or service may be overwritten or appended within the database 105 in order to reflect the most recent rule set. Still further, the profile updating module 209 may enable rules to be subsequently adapted by the reactive control platform 103 automatically based on the detection of an action by the same user per the activity detection module 203.

In one embodiment, the action module 211 initiates enforcement of the rules as stored by the profile updating module 209. By way of example, the enforcement may correspond to execution of the one or more conditions, criteria, instructions or the like by the devices 108, 110 or 101, the one or more services (per service providers 106), or a combination thereof. Still further, the enforcement may correspond to the action of accepting, denying or restricting the activity of a user with respect to a given resource of the premise 102, as initiated per the input requested by the subscriber validation module 207. The action module 211 may submit a command to the devices and/or one or more services to invoke (initiate) execution of the specified rules as a machine language instruction or other language.

It is noted that the action module 211 may also generate and enforce rules automatically based on analysis of profile information regarding a user. The analysis may include, for example, determining a pattern or tendency of use of a resource of the premise over time by a user, a pattern or history of one or more rules enforced by the subscriber per the user, or a combination thereof. Based on this analysis, the action module 211 may then generate a rule in response to a subsequent activity of the user. In this case, the action module 211 may further operate in connection with the user interface module 213 for generating a feedback message for the subscriber regarding the rule.

In one embodiment the user interface module 213 enables presentment of a graphical user interface for presenting messages regarding the rules or enforcement thereof. In addition, the user interface module 213 may enable execution of a configuration interface for allowing the subscriber to customize various restrictions. By way of example, the user interface module 215 generates the interface in response to application programming interfaces (APIs) or other function calls.

In one embodiment, a communication module 215 enables formation of a session over a network 109 between the platform 103 and the user devices 101. By way of example, the communication module 215 executes various protocols and data sharing techniques for enabling collaborative execution between a subscriber's user device (e.g., mobile devices, laptops, smartphones, tablet computers, desktop computers) and the reactive control platform 103 over the network 109.

The above presented modules and components of the reactive control platform 103 can be implemented in hardware, firmware, software, or a combination thereof. Though depicted as a separate entity in FIG. 1, it is contemplated that the reactive control platform 103 may be implemented for direct operation by the resources of the premise, i.e., routers, set-top boxes, computers. As such, the platform 103 may generate direct signal inputs by way of the operating system of the device for interacting with the services of the service providers 106. In another embodiment, one or more of the modules 201-215 may be implemented for operation by respective user devices (e.g., of the subscriber) as a platform 103, or combination thereof.

Figure 6:
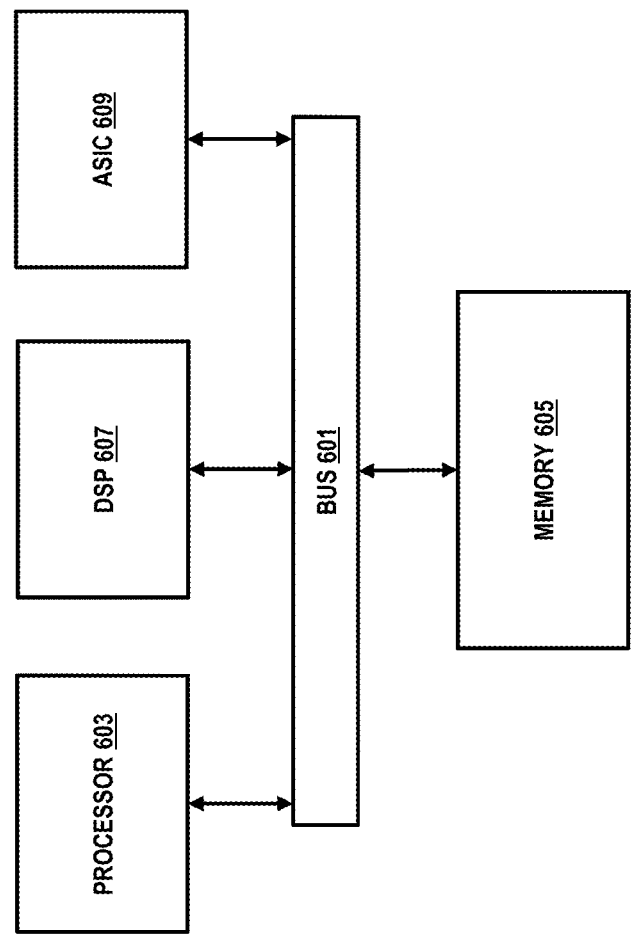
FIG. 6 is a diagram of a chip set that can be used to implement an embodiment of the invention.

FIGS. 3A-3D are flowcharts of a process for enabling a subscriber to establish rules for controlling user interaction with a resource based on the activity of the user, according to various embodiments. In one embodiment, the reactive control platform 103 performs processes 300, 308, 314 and 320 and is implemented in, for instance, a chip set including a processor and a memory as shown in FIG. 6.

In step 301 of process 300 (FIG. 3A), the reactive control platform 103 monitors a current activity of a user of a device, one or more services, or a combination thereof associated with a subscriber during access by the user to a network of a subscriber. The current activity may correspond to an action or task of the device or one or more services, such as a channel selection, content download, recording of content, etc. In step 303, the platform 103 determines a status of the user based on the monitoring, profile information associated with the user, or a combination thereof. The status may indicate whether the user is a first time or previous user of the service (e.g., per service providers 106), the device (e.g., STB 108, user device 101) or the network (e.g., LAN 107).

In another step 305, the reactive control platform 103 generates a request for input from the subscriber for specifying one or more rules to be enforced for affecting a use of the device, the one or more services, the network of the subscriber, or a combination thereof by the user based on the determination. In another step 307, the platform 103 transmits the request to a user device of the subscriber. The request specifies the user, the current activity of the user, the status of the user, or a combination thereof. Under this scenario, the input may be provided by the subscriber via a mobile device or other computing device of the subscriber for enabling a real-time response to the request.

In step 309 of process 308 (FIG. 3B), the reactive control platform 103 receives the input from the subscriber. In another step 311, the platform 103 stores the one or more rules in association with the user. The one or more rules may include one or more instructions for restricting, denying, allowing, or a combination thereof, the use of the device, the one or more services, the network of the subscriber, or a combination thereof. It is noted that the restriction may correspond to (a) a limited use of the device, the one or more services, the network of the subscriber, or a combination thereof, a (b) conditional use of the device, the one or more services, the network of the subscriber, or a combination thereof, or (c) a combination thereof based on channel information, content information, a content type, a timeframe, network address information, location information, activity type information, device information, user information, or a combination thereof.

In another step 313, the reactive control platform 103 generates the profile information based on the status of the user, the input, or a combination thereof. The storing of the one or more rules in association with the user is based on the generation of the profile. Hence, the reactive control platform may build the profile over time as the rules are updated or otherwise adapted based on subsequent attempts by the user to access the device, the one or more services, the network, or a combination thereof.

In step 315 of process 314 (FIG. 3C), the reactive control platform 103 initiates enforcement of the one or more rules based on the input, the profile information associated with the user, or a combination thereof. In steps 317 and 319, the platform 103 generates an enforcement message based on the status of the user and initiates a presentment of the enforcement message to the device, another device associated with the user, or a combination thereof, respectively. It is noted that the enforcement may correspond to execution of the one or more conditions, criteria, instructions or the like by the devices 108, 110 or 101, the one or more services (per service providers 106), or a combination thereof. Still further, the enforcement may correspond to the action of accepting, denying or restricting the activity of a user with respect to a given resource of the premise 102.

In step 321 of process 320 (FIG. 3D), the reactive control platform 103 determines context information associated with the user, the device, or a combination thereof. In step 323, the platform 103 determines whether the user (a) is associated with existing profile information, (b) has one or more previously associated rules, (c) has a previous history of activity, or (d) a combination thereof. As noted previously, the status of the user for performing the current activity is based on the determination, the context information, or a combination thereof and the status indicates whether the user is a new or existing user of the device, the one or more services, or a combination thereof. In the case, for example, where the status of the user is determined to be new (e.g., a first time user of the resource in question), a new profile may be generated in association with the user, a device of the user, or a combination thereof. In the case where the status of the user indicates they are a previous user, the existing profile information may be updated to include the specified rules. By way of this approach, a prior set of rules related to the same activity, device or service may be overwritten or appended in order to reflect the most recent rule set.

In step 323, the reactive control platform 103 generates the one or more rules automatically based on the status of the user, the monitoring of the current activity of the user, a history of activity of the user over a period of time, a history of the one or more rules enforced over time, or a combination thereof. As noted previously, the current activity of the user may include a request for access to a channel, content, a network address, a location, a device, user information, or a combination thereof. Also, of note, the device may be a set-top box, a router, a computer, a mobile device, a gaming system, a communication system, or a combination thereof and the one or more services may include a content delivery service, a network service, a security service, an information retrieval service, a gaming service, a social networking service, a communication service, or a combination thereof.

FIGS. 4A-4F are diagrams of user interfaces utilized in the processes of FIGS. 3A-3D, according to various embodiments. For the purpose of illustration, the diagrams are described with respect to an exemplary use case of a user named John, an 11 year old boy that has been granted access to the resources of a subscriber that maintains a personal network at their private residence. Under this scenario, John is logged into the network and has limited to no controls established for influencing his level of use and/or access to the resources. Also, for the purpose of illustration, the subscriber is not physically located at any of their residence, but has configured the resources for interaction with the reactive control platform 103.

Figure 4B:
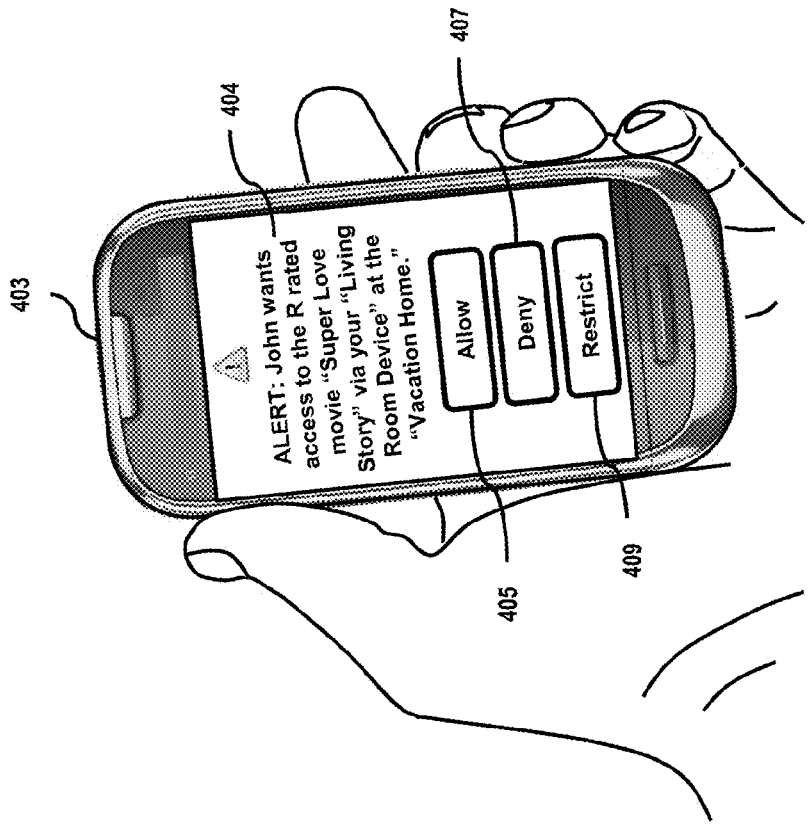
FIGS. 4A-4F are diagrams of user interfaces utilized in the processes of FIGS. 3A-3D, according to various embodiments.
Figure 4A:
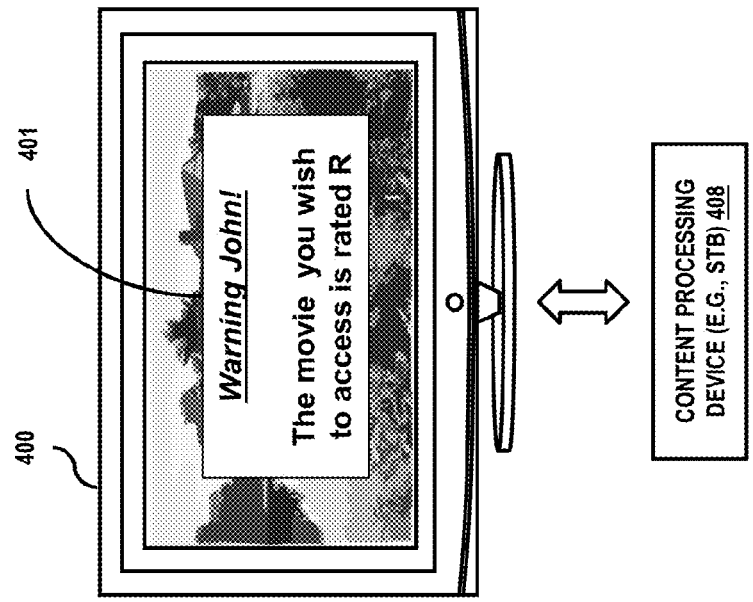

In FIG. 4A, the reactive control platform 103 monitors Johns use of a set-top box 408, which is further integrated with a display system 400. As such, the platform 103 maintains activity history information regarding the use of the resources in connection with profile information for John. When John attempts to access content that is rated R, a warning message 401 is generated for presentment to John regarding his current activity. This may correspond to a basic level of intelligent monitoring on the part of the platform 103 in lieu of a fully established rule set, wherein the login information for indicating the youth of the user is accounted for with respect to the content type attempting to be accessed.

In addition, the platform 103 transmits a request message to the mobile device 403 of the subscriber, as depicted with respect to FIG. 4B. In this case, the request message 404 specifies the identity of the user that is currently interacting with a resource, some level of detail regarding the activity in which the user is engaging, a location of the resource the user is engaging, etc. The message 404 is therefore crafted by the platform 103 in a manner to provide sufficient detail to the subscriber regarding the current activity of the user for supporting their ability to establish one or more rules in association with the user and/or activity accordingly.

Also presented per the request message are one or more user selection options for receiving a subscriber input (or response) to the request. Under this scenario, the user selection options correspond to one or more action buttons 405-409. By way of example, an ALLOW action button 405 may be selected by the user for specifying allowance of the action that is currently being performed by John while the DENY action button 407 specifies disallowance of the action. Alternatively, the subscriber may select a RESTRICT action button 409 for specifying their decision to limit use of the set-top box 408 and/or the service for downloading the R rated content on a conditional basis. In the case where the RESTRICT action button is selected, an additional configuration interface is presented to the subscriber as depicted with respect to FIG. 4C.

Figure 4D:
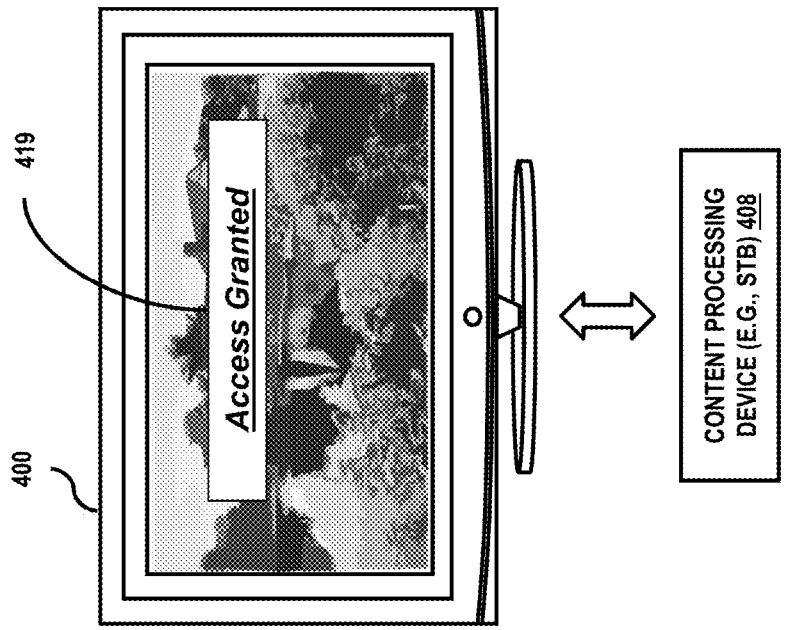
Figure 4C:
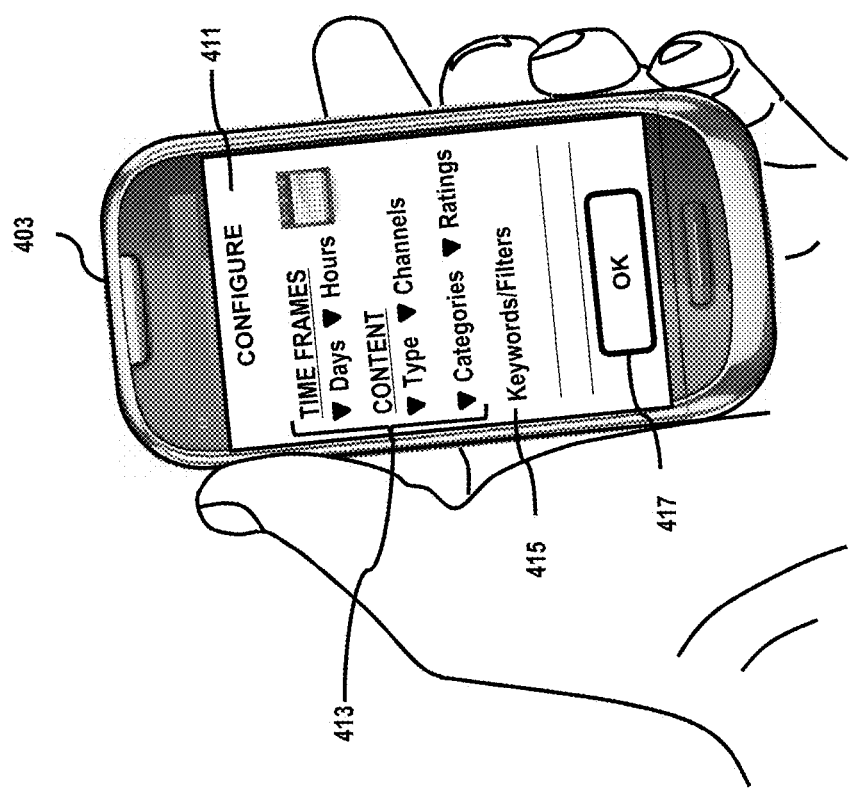
Figure 4F:
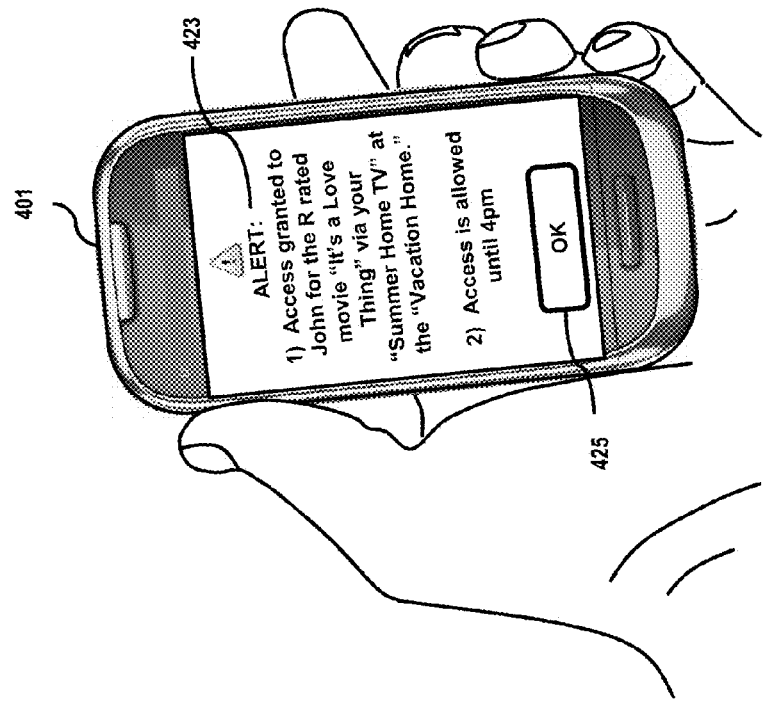

In FIG. 4C, the subscriber is presented with additional selection options for configuring one or more customized rules or limits based on the current activity of the user. By way of example, the user may be presented with control elements 413 for establishing a time frame of use of the set-top box 408, including an option for setting a specific day or hour range of use. Selection of this option limits use of the set-top box 408 and/or the current movie to a certain viewing period. Alternatively, the time frame may correspond to a time of allowed viewing of the movie, thus corresponding to a subscriber preferred time wherein content may be viewed. In the case where John is expected to be doing homework at the time he is attempting to access the movie, the subscriber can restrict his viewing to a later time of day.

The control elements 413 may also enable the subscriber to specify their content control preferences, including an option for specifying a content type restrictions for John (e.g., allow only movies, audio and games), channels restrictions (e.g., allow Disney Channel and Cartoon Network but prevent Showtime), content category restrictions (e.g., allow only cartoons and educational content) and content rating restrictions (e.g., allow only G or PG-13 content). In addition, the subscriber may specify one or more keywords 415 for establishing customized content filters. So, for example, in the case where the subscriber specifies the keyword "sexual," any content of this nature be restricted from use by John. Once configured, the subscriber may select the OK action button 417.

In FIG. 4D, when the subscriber allows access to the movie content on an unrestricted basis (e.g., selection of the ALLOW action button 405) or on a restricted basis (e.g., as configured per the configuration interface 411), a message 419 is presented to the display 400 for John. In addition, the reactive control platform 103 stores the rules established as profile information in connection with John. John is then permitted to enjoy the movie content per the rules established by the subscriber. In the case where John is not allowed by the subscriber, an alternate message 419 may be presented for reflecting this disapproval and the movie content may be discontinued or blocked.

Figure 4E:
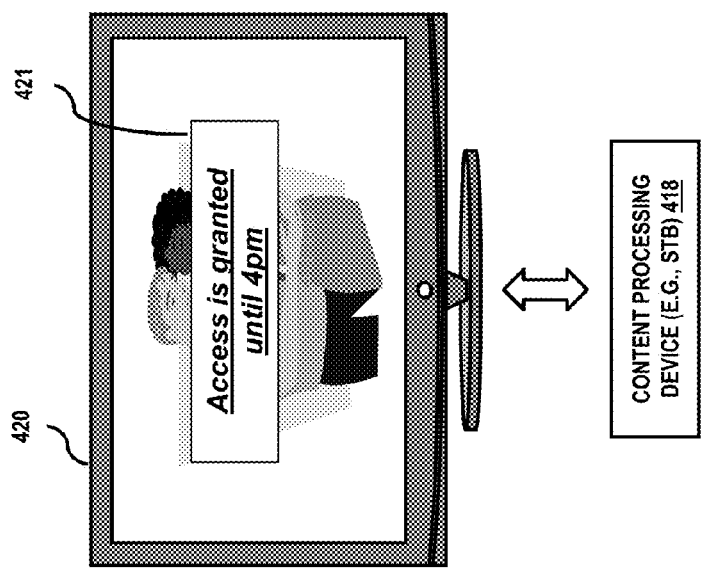

In FIG. 4E, having monitored John's activity and having established one or more rules in association with John previously, the reactive control platform 103 is able to automatically generate (or recommend the generation of) rules based on the activity of the user. In this example, John attempts to access another R rated movie via set-top box 418, which is a set-top box configured to a LAN of a second residence of the subscriber (e.g., a vacation home). Under this scenario, having identified John as the user responsible for the triggering action with respect to the set-top box 418, the platform 103 accesses the profile information for John. Upon analysis, the platform identifies a historical tendency of John to access R rated, romantic, drama content. In addition, the platform 103 identified a typical time of access is 3 pm (after school). Still further, prior rules established for John's activity with respect to the set-top box 408 at the primary residence indicate the subscriber established restrictions of allowing for this content until 4 pm Monday through Friday with the condition that no explicit sexual content is associated with the movie.

Based on this history, the platform 103 automatically associates the same rules and restrictions to John's use of the other set-top box 418. As such, the profile information for John is updated to indicate that the rules apply to John's use of the set-top box at the vacation home as well. In addition, a message 421 may be presented to John via the display 420 for indicating the access condition established by the subscriber. Still further, the platform 103 may transmit a feedback message 423 to the mobile device 401 of the subscriber for indicating the automated action taken by the platform 103. In this example, the feedback message 423 indicates details regarding the action taken per the applied rules, the identity of the user that is currently interacting with the resource, some level of detail regarding the activity in which the user is engaging (e.g., name and rating of the movie), a location of the resource the user is engaging (e.g., the set-top box at the vacation home), etc. The message also indicates the conditional time frame setting.

The subscriber may accept the action by selecting the OK action button 425. While not shown in this example, an additional ADAPT action button may also be presented for allowing the user to adapt the applied rule setting. As such, upon selection, the subscriber may be presented again with the configuration interface 411 of FIG. 4C for enabling customization of the rules.

Still further, as another scenario, the same rules established with respect to John may also be applied to his younger brother automatically when it is detected the younger brother is interacting with the set-top box 408 at the primary residence. The platform 103 may establish these rules based on the historical response of the subscriber to John's activities, the status of the user as John's younger brother one year apart, contextual information for indicating the time of interaction with movie content, etc. Hence, the rules are associated with profile information for the younger brother.

In the case where an older sibling who is of driving age is interacting with is a locked garage that features a biometric entry security system, the reactive control platform 103 may identify this sibling based on their biometric information. Accordingly, the platform 103 may automatically apply a restriction to the security system for restricting access to the garage door until 4 pm based on the restrictions established for the other siblings per the set-top boxes 408 and 418. Hence, it is noted that the reactive control platform 103 may generate actions and/or rules to be applied automatically based on the historical patterns and/or activities with any of the resources of the subscriber. The accuracy of the actions invoked and/or recommended may progressively increase over time as additional activities and responses thereto are monitored and recorded by the platform 103.

While presented herein as an automated action, it is noted that the reactive control platform 103 may be configured to provide a recommended action to be executed by the reactive control platform 103. In this way, the rules established for affecting real-time interaction of a user with a device is not readily associated with the profile of the user until feedback from the subscriber is acquired. In either implementation, however, the platform 103 enables the convenient, real-time establishment of rules regarding the different users and different resources.

The processes described herein for enabling a subscriber to establish rules for controlling user interaction with a resource based on the activity of the user may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 5:
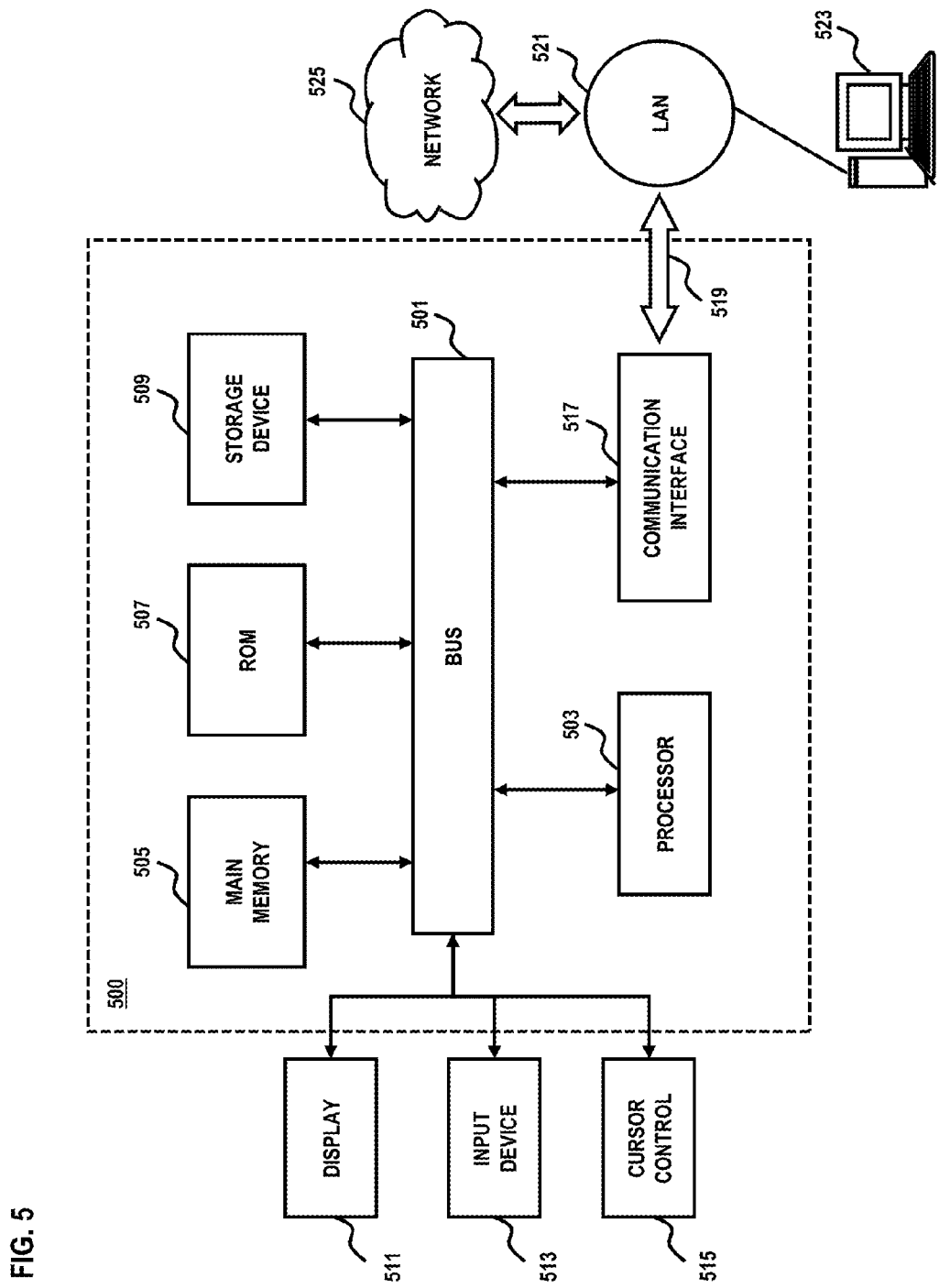
FIG. 5 is a diagram of a computer system that can be used to implement various exemplary embodiments.

FIG. 5 is a diagram of a computer system that can be used to implement various exemplary embodiments. The computer system 500 includes a bus 501 or other communication mechanism for communicating information and one or more processors (of which one is shown) 503 coupled to the bus 501 for processing information. The computer system 500 also includes main memory 505, such as a random access memory (RAM) or other dynamic storage device, coupled to the bus 501 for storing information and instructions to be executed by the processor 503. Main memory 505 can also be used for storing temporary variables or other intermediate information during execution of instructions by the processor 503. The computer system 500 may further include a read only memory (ROM) 507 or other static storage device coupled to the bus 501 for storing static information and instructions for the processor 503. A storage device 509, such as a magnetic disk or optical disk, is coupled to the bus 501 for persistently storing information and instructions.

The computer system 500 may be coupled via the bus 501 to a display 511, such as a cathode ray tube (CRT), liquid crystal display, active matrix display, or plasma display, for displaying information to a computer user. An input device 513, such as a keyboard including alphanumeric and other keys, is coupled to the bus 501 for communicating information and command selections to the processor 503. Another type of user input device is a cursor control 515, such as a mouse, a trackball, or cursor direction keys, for communicating direction information and command selections to the processor 503 and for adjusting cursor movement on the display 511.

According to an embodiment of the invention, the processes described herein are performed by the computer system 500, in response to the processor 503 executing an arrangement of instructions contained in main memory 505. Such instructions can be read into main memory 505 from another computer-readable medium, such as the storage device 509. Execution of the arrangement of instructions contained in main memory 505 causes the processor 503 to perform the process steps described herein. One or more processors in a multi-processing arrangement may also be employed to execute the instructions contained in main memory 505. In alternative embodiments, hard-wired circuitry may be used in place of or in combination with software instructions to implement the embodiment of the invention. Thus, embodiments of the invention are not limited to any specific combination of hardware circuitry and software.

The computer system 500 also includes a communication interface 517 coupled to bus 501. The communication interface 517 provides a two-way data communication coupling to a network link 519 connected to a local network 521. For example, the communication interface 517 may be a digital subscriber line (DSL) card or modem, an integrated services digital network (ISDN) card, a cable modem, a telephone modem, or any other communication interface to provide a data communication connection to a corresponding type of communication line. As another example, communication interface 517 may be a local area network (LAN) card (e.g. for Ethernet™ or an Asynchronous Transfer Model (ATM) network) to provide a data communication connection to a compatible LAN. Wireless links can also be implemented. In any such implementation, communication interface 517 sends and receives electrical, electromagnetic, or optical signals that carry digital data streams representing various types of information. Further, the communication interface 517 can include peripheral interface devices, such as a Universal Serial Bus (USB) interface, a PCMCIA (Personal Computer Memory Card International Association) interface, etc. Although a single communication interface 517 is depicted in FIG. _, multiple communication interfaces can also be employed.

The network link 519 typically provides data communication through one or more networks to other data devices. For example, the network link 519 may provide a connection through local network 521 to a host computer 523, which has connectivity to a network 525 (e.g. a wide area network (WAN) or the global packet data communication network now commonly referred to as the "Internet") or to data equipment operated by a service provider. The local network 521 and the network 525 both use electrical, electromagnetic, or optical signals to convey information and instructions. The signals through the various networks and the signals on the network link 519 and through the communication interface 517, which communicate digital data with the computer system 500, are exemplary forms of carrier waves bearing the information and instructions.

The computer system 500 can send messages and receive data, including program code, through the network(s), the network link 519, and the communication interface 517. In the Internet example, a server (not shown) might transmit requested code belonging to an application program for implementing an embodiment of the invention through the network 525, the local network 521 and the communication interface 517. The processor 503 may execute the transmitted code while being received and/or store the code in the storage device 509, or other non-volatile storage for later execution. In this manner, the computer system 500 may obtain application code in the form of a carrier wave.

The term "computer-readable medium" as used herein refers to any medium that participates in providing instructions to the processor 503 for execution. Such a medium may take many forms, including but not limited to computer-readable storage medium ((or non-transitory)—i.e., non-volatile media and volatile media), and transmission media. Non-volatile media include, for example, optical or magnetic disks, such as the storage device 509. Volatile media include dynamic memory, such as main memory 505. Transmission media include coaxial cables, copper wire and fiber optics, including the wires that comprise the bus 501. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

FIG. 6 illustrates a chip set or chip 600 upon which an embodiment of the invention may be implemented. Chip set 600 is programmed to enable a subscriber to establish rules for controlling user interaction with a resource based on the activity of the user as described herein and includes, for instance, the processor and memory components described with respect to FIG. 5 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 600 can be implemented in a single chip. It is further contemplated that in certain embodiments the chip set or chip 600 can be implemented as a single "system on a chip." It is further contemplated that in certain embodiments a separate ASIC would not be used, for example, and that all relevant functions as disclosed herein would be performed by a processor or processors. Chip set or chip 600, or a portion thereof, constitutes a means for performing one or more steps of enabling a subscriber to establish rules for controlling user interaction with a resource based on the activity of the user.

In one embodiment, the chip set or chip 600 includes a communication mechanism such as a bus 601 for passing information among the components of the chip set 600. A processor 603 has connectivity to the bus 601 to execute instructions and process information stored in, for example, a memory 605. The processor 603 may include one or more processing cores with each core configured to perform independently. A multi-core processor enables multiprocessing within a single physical package. Examples of a multi-core processor include two, four, eight, or greater numbers of processing cores. Alternatively or in addition, the processor 603 may include one or more microprocessors configured in tandem via the bus 601 to enable independent execution of instructions, pipelining, and multithreading.

The processor 603 may also be accompanied with one or more specialized components to perform certain processing functions and tasks such as one or more digital signal processors (DSP) 607, or one or more application-specific integrated circuits (ASIC) 609. A DSP 607 typically is configured to process real-world signals (e.g., sound) in real time independently of the processor 603. Similarly, an ASIC 609 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 600 includes merely one or more processors and some software and/or firmware supporting and/or relating to and/or for the one or more processors.

The processor 603 and accompanying components have connectivity to the memory 605 via the bus 601. The memory 605 includes both dynamic memory (e.g., RAM, magnetic disk, writable optical disk, etc.) and static memory (e.g., ROM, CD-ROM, etc.) for storing executable instructions that when executed perform the inventive steps described herein to enable a subscriber to establish rules for controlling user interaction with a resource based on the activity of the user. The memory 605 also stores the data associated with or generated by the execution of the inventive steps.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
   monitoring a current activity of a user of a device, one or more services, or a combination thereof associated with a subscriber during access by the user to a network of the subscriber;
   determining a status of the user based on the monitoring, profile information associated with the user, or a combination thereof, the status indicating whether the user is a new or existing user of the device, the one or more services, or a combination thereof;
   generating, based on the determination of the status of the user, a request for input from the subscriber that specifies one or more rules;
   enforcing the one or more rules to affect a use, by the user, of the device, the one or more services, the network of the subscriber, or a combination thereof;
   determining context information associated with the user, the device of the user, or a combination thereof; and
   determining whether the user (a) is associated with existing profile information, (b) was previously associated with the one or more rules, (c) has a previous history of activity, or (d) a combination thereof,
   wherein the status of the user for performing a current activity is based on the determination of (a), (b), (c), or (d), the context information, or a combination thereof.

2. The method of claim 1, further comprising:
   transmitting the request to a user device of the subscriber, wherein the request specifies the user, the current activity of the user, the status of the user, or a combination thereof and the user device of the subscriber is a mobile device.

3. The method of claim 1, further comprising:
   receiving the input from the subscriber; and
   storing the one or more rules in association with the user, wherein the one or more rules includes one or more instructions for restricting, denying, allowing, or a combination thereof of the use of the device, the one or more services, the network of the subscriber, or a combination thereof.

4. The method of claim 3, wherein the restriction corresponds to (a) a limited use of the device, the one or more services, the network of the subscriber, or a combination thereof, a (b) conditional use of the device, the one or more services, the network of the subscriber, or a combination thereof, or (c) a combination thereof based on channel information, content information, a content type, a timeframe, network address information, location information, activity type information, device information, user information, or a combination thereof.

5. The method of claim 3, further comprising:
   generating the profile information based on the status of the user, the input from the subscriber, or a combination thereof,
   wherein the storing of the one or more rules in association with the user is based on the generation of the profile information.

6. The method of claim 1, further comprising:
   generating an enforcement message based on the status of the user; and
   initiating a presentment of the enforcement message to the device, another device associated with the user, or a combination thereof,
   wherein the enforcement of the one or more rules includes the presenting of the enforcement message.

7. The method of claim 1, further comprising:
   generating the one or more rules automatically based on the status of the user, the monitoring of the current activity of the user, a history of activity of the user over a period of time, a history of the one or more rules enforced over time, or a combination thereof,
   wherein the current activity of the user includes a request for access to a channel, content, a network address, a location, a device, user information, or a combination thereof.

8. The method of claim 1, wherein the device is a set-top box, a router, a computer, a mobile device, a gaming system, a communication system, or a combination thereof and the one or more services include a content delivery service, a network service, a security service, an information retrieval service, a gaming service, a social networking service, a communication service, or a combination thereof.

9. An apparatus comprising a processor configured to:
   monitor a current activity of a user of a device, one or more services, or a combination thereof associated with a subscriber during access by the user to a network of the subscriber;
   determine a status of the user based on the monitoring, profile information associated with the user, or a combination thereof, the status indicating whether the user is a new or existing user of the device, the one or more services, or a combination thereof;
   generate, based on the determination of the status of the user, a request for input from the subscriber that specifies one or more rules;

enforce the one or more rules to affect a use, by the user, of the device, the one or more services, the network of the subscriber, or a combination thereof;

determine context information associated with the user, the device of the user, or a combination thereof; and determine whether the user (a) is associated with existing profile information, (b) was previously associated with the one or more rules, (c) has a previous history of activity, or (d) a combination thereof, wherein the status of the user for performing a current activity is based on the determination of (a), (b), (c), or (d), the context information, or a combination thereof.

10. The apparatus of claim 9, wherein the processor is further configured to:

transmit the request to a user device of the subscriber, wherein the request specifies the user, the current activity of the user, the status of the user, or a combination thereof and the user device of the subscriber is a mobile device.

11. The apparatus of claim 9, wherein the process is further configured to:

receive the input from the subscriber; and store the one or more rules in association with the user, wherein the one or more rules includes one or more instructions for restricting, denying, allowing, or a combination thereof of the use of the device, the one or more services, the network of the subscriber, or a combination thereof.

12. The apparatus of claim 11, wherein the restriction corresponds to (a) a limited use of the device, the one or more services, the network of the subscriber, or a combination thereof, a (b) conditional use of the device, the one or more services, the network of the subscriber, or a combination thereof, or (c) a combination thereof based on channel information, content information, a content type, a timeframe, network address information, location information, activity type information, device information, user information, or a combination thereof.

13. The apparatus of claim 11, wherein the process is further configured to:

generate the profile information based on the status of the user, the input from the subscriber, or a combination thereof, wherein the storing of the one or more rules in association with the user is based on the generation of the profile information.

14. The apparatus of claim 9, wherein the processor is further configured to:

initiate enforcement of the one or more rules based on the input, the profile information associated with the user, or a combination thereof.

15. The apparatus of claim 14, wherein the processor is further configured to:

generating an enforcement message based on the status of the user; and initiating a presentment of the enforcement message to the device, another device associated with the user, or a combination thereof, wherein the enforcement of the one or more rules includes the presenting of the enforcement message.

16. The apparatus of claim 9, wherein the processor is further configured to:

generate the one or more rules automatically based on the status of the user, the monitoring of the current activity of the user, a history of activity of the user over a period of time, a history of the one or more rules enforced over time, or a combination thereof, wherein the current activity of the user includes a request for access to a channel, content, a network address, a location, a device, user information, or a combination thereof.

17. The apparatus of claim 9, wherein the device is a set-top box, a router, a computer, a mobile device, a gaming system, a communication system, or a combination thereof and the one or more services include a content delivery service, a network service, a security service, an information retrieval service, a gaming service, a social networking service, a communication service, or a combination thereof.

18. A system comprising:

a platform configured to:

monitor a current activity of a user of a device, one or more services, or a combination thereof associated with a subscriber during access by the user to a network of the subscriber;

determine a status of the user based on the monitoring, profile information associated with the user, or a combination thereof, the status indicating whether the user is a new or existing user of the device, the one or more services, or a combination thereof;

generate, based on the determination of the status of the user, a request for input from the subscriber that specifies one or more rules;

enforce the one or more rules to affect a use, by the user, of the device, the one or more services, the network of the subscriber, or a combination thereof;

determine context information associated with the user, the device of the user, or a combination thereof; and determine whether the user (a) is associated with existing profile information, (b) was previously associated with the one or more rules, (c) has a previous history of activity, or (d) a combination thereof, wherein the status of the user for performing a current activity is based on the determination of (a), (b), (c), or (d), the context information, or a combination thereof.

19. The system of claim 18, wherein the platform is further configured to:

transmit the request to a user device of the subscriber, and wherein the request specifies the user, the current activity of the user, the status of the user, or a combination thereof and the user device of the subscriber is a mobile device.

20. The system of claim 18, wherein the platform is further configured to:

receive the input from the subscriber, and store the one or more rules in association with the user; and wherein the one or more rules includes one or more instructions for restricting, denying, allowing, or a combination thereof of the use of the device, the one or more services, the network of the subscriber, or a combination thereof.

* * * * *